United States Patent [19]

Salvat et al.

[11] 4,335,387
[45] Jun. 15, 1982

[54] RADAR ANTENNA WITH ROTATING LINEAR POLARIZATION DESIGNED TO REDUCE JAMMING

[75] Inventors: François Salvat; Jean Bouko; Jean Le Foll, all of Paris, France

[73] Assignee: Thomson-CSF, Paris, France

[21] Appl. No.: 158,794

[22] Filed: Jun. 12, 1980

[30] Foreign Application Priority Data

Jun. 13, 1979 [FR] France ................. 79 15139

[51] Int. Cl.$^3$ .................. H01Q 15/24; G01S 7/36; H01Q 19/00
[52] U.S. Cl. ............................ 343/756; 343/18 E; 343/100 PE; 343/781 CA
[58] Field of Search ............ 343/18 E, 100 PE, 756, 343/781 CA

[56] References Cited

U.S. PATENT DOCUMENTS

| 2,736,895 | 2/1956 | Cochrane | 343/756 |
| 3,771,160 | 11/1973 | Laverick | 343/756 |
| 3,797,020 | 3/1974 | Roger et al. | 343/756 |
| 4,220,957 | 9/1980 | Britt | 343/756 |

*Primary Examiner*—T. H. Tubbesing

*Attorney, Agent, or Firm*—Karl F. Ross

[57] ABSTRACT

A radar antenna of the Cassegrain type comprises a paraboloidal principal reflector confronting a hyperboloidal or flat auxiliary reflector of smaller radius directing linearly polarized radiation from a source on their common axis toward the principal reflector along lines passing through the focal point thereof to produce an axially extending outgoing beam whose central part is intercepted by the auxiliary reflector. The latter consists of an array of linear conductors generally parallel to the direction of polarization while the principal reflector is formed by another conductor array generally inclined at 45° to that direction, the latter array being backed by a solid mirror separated therefrom by a distance smaller than a quarter wavelength at the midfrequency of the emitted radiation. The composite wave leaving the principal reflector has an elliptical polarization which it retains in an annular portion of the outgoing beam bypassing the auxiliary reflector; only a linearly polarized component of that wave rotated through 90° from the original direction of polarization, however, passes the array of the auxiliary reflector in the central beam portion intercepted thereby.

5 Claims, 3 Drawing Figures

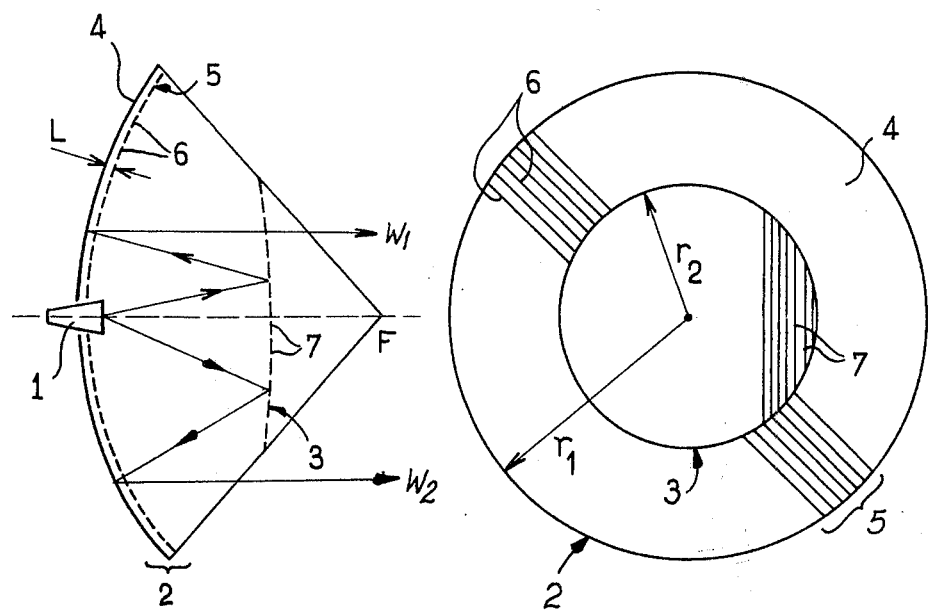
FIG_1    FIG_2
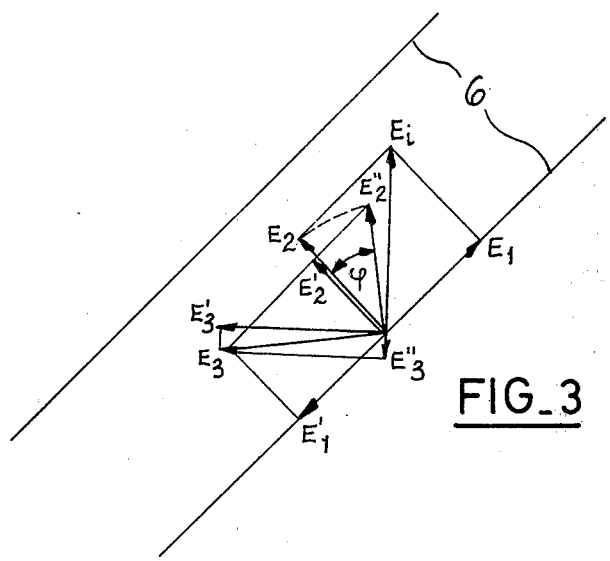
FIG_3

RADAR ANTENNA WITH ROTATING LINEAR POLARIZATION DESIGNED TO REDUCE JAMMING

FIELD OF THE INVENTION

Our present invention relates to a radar antenna of the Cassegrain type rotating linear polarization, associated with means for tracking and angular-deviation measurement establishing an off-boresight curve which always has a notch in the same direction whatever the direction of the rectilinear polarization of the echo.

BACKGROUND OF THE INVENTION

A radar of this type used for tracking and for angular-deviation measurement, i.e. determining the offset in the position of the target with respect to the boresight axis of the antenna, presents a radiation pattern with linear polarization which is perpendicular to the direction of polarization of the wave emitted by the source illuminating the antenna. Since the skin echo reflected by the target, just like the signal sent by a jammer with which the target may be equipped, may have any direction of polarization whatever, the tracking radar can no longer accurately perceive the target. This is particularly true when the direction of polarization of the signal received is close to the normal operating polarization of the antenna, as may be the case with a rotating rectilinear polarization jammer.

OBJECT OF THE INVENTION

The object of our invention is to provide means in such a radar for reducing jamming with elimination of the above-mentioned disadvantages.

SUMMARY OF THE INVENTION

We realize this object, pursuant to our present invention, by providing a Cassegrain-type antenna with a paraboloidal principal reflector and an auxiliary reflector or smaller radius coaxially confronting each other, the auxiliary reflector being illuminated by a source of linearly polarized outgoing radiation centered on the reflector axis. The principal reflector includes a solid concave mirror and a first array of linear conductors disposed in parallel planes which include an angle of 45° with the direction of polarization of the radiation emitted by the source, this array being spaced from the mirror by a distance that is substantially different from and preferably less than a quarter wavelength at the midfrequency of that radiation. The auxiliary reflector is formed from a second array of linear conductors disposed in planes which are parallel to one another and to the direction of polarization of the source and which therefore direct the outgoing radiation from that source toward the principal reflector whence the radiation is sent out with elliptical polarization in an axially extending beam. Owing to the difference between the radii of the two reflectors, only a central part of the outgoing beam is intercepted by the auxiliary reflector whose conductors pass only a certain component of its radiation whose polarization is linear and perpendicular to the original direction; the radiation in an nonintercepted annular part of the beam retains its elliptical polarization.

When the mirror and the conductor array of the paraboloidal principal reflector are homofocal, their common focal point may coincide with a focus of a hyperboloidally curved conductor array of the auxiliary reflector whose other focus coincides with the phase center of the source.

Our improved radar antenna thus radiates, in addition to the pattern with linear polarization perpendicular to the direction of polarization of the wave emitted by the source, an elliptical polarization pattern; this property enables an off-boresight curve to be obtained having the same direction as that obtained with normal polarization, whatever the angle of the linear polarization emitted by the jammer, and is used in accordance with our invention to reduce the effect of a jammer with rotating linear polarization.

BRIEF DESCRIPTION OF THE DRAWING

The above and other features of the present invention will become apparent from the following description, given solely by way of non-limiting illustration, when taken in conjunction with the accompanying drawing in which:

FIG. 1 is a profile view of a radar antenna embodying our invention;

FIG. 2 is a front view of the antenna shown in FIG. 1; and

FIG. 3 shows the components of the electrical field vector at the location of a network of wires of a principal reflector forming part of the antenna.

SPECIFIC DESCRIPTION

The embodiment of our invention shown in the drawing comprises a Cassegrain type antenna with polarization rotation including a paraboloidal principal reflector 2 illuminated by a source 1 of electromagnetic waves with linear polarization. The antenna further includes a secondary reflector 3, formed by a hyperboloid, one of whose focal points is at the phase center of source 7 while the other is at the focal point F of reflector 2. The secondary reflector 3 may also be planar and located midway between point 7 and the phase center of source 1 so that the image of the phase center coincides with point F. In any event, the diameter $2r_2$ of reflector 3 is less than the diameter $2r_1$ of the principal reflector 2. The direction of the polarization of source 1 is assumed horizontal in the illustrated embodiment. The principal reflector 2 is formed by a reflecting parabolic mirror 4 and by a homofocal network or array 5 of parallel metal wires 6 placed at a given distance L therefrom which is substantially less than a quarter of a wavelength at the central frequency of the operating band. The wires 6 lie in axial planes including an angle of 45° with the direction of polarization of source 1. The auxiliary reflector 3 is formed by a network or array of metal wires which lies in axial plane parallel to the direction of polarization of the wave emitted by source 1. The diameter and the spacing of wires 7 are suitably chosen so that the network is reflecting for the polarization of the wave emitted by source 1 and transparent for perpendicular polarization. Wires 6 and 7 may be replaced by glass fibers enveloped by metal wires, they may also be metal strips.

In FIG. 2 an annular portion of reflector 2 external to wires 7 can be seen.

As shown in FIG. 3, which represents a substantially planar area of the network 5 of wires 6, the incident wave $E_i$ coming from source 1 and reflected by the network of wires 7 may be broken down in two orthogonal directions, a first component $E_1$ being parallel to wires 6 and a second component $E_2$ being perpendicular thereto. Component $E_1$ is reflected on wires 6 with a phase change of 180° giving a component $E'_1$. Component $E_2$ passes through network 5 and is reflected with a phase change of 180° by mirror 4. The total phase shift undergone by $E_2$ is equal to a phase shift of 180° due to reflection at mirror 4 added to the phase shift corresponding to the round trip between mirror 4 and network 5.

In a conventional Cassegrain antenna with polarization rotation, the round-trip path is equal to $\lambda/2$ causing a total phase shift of 360°. In the antenna according to our invention, this total phase shift is substantially different from 360°, preferably less with $L<\lambda/4$; at $E'_2$ we have indicated the projection in the plane of FIG. 3 of the vector $E''_2$ of the wave reflected by mirror 4 upon the direction perpendicular to wires 6, i.e. the component of that reflected wave clearing the network 5. Vectorial addition of this component $E'_2$ to component $E'_1$ yields a resultant $E_3$. This vector $E_3$ may in its turn be broken down into a vector $E'_3$ perpendicular to $E_i$ and a vector $E''_3$ parallel to $E_i$.

After this reflection at principal reflector 2, the composite wave whose direction of polarization is that of vector $E_3$ forms an axially oriented beam whose central part, of radius $r_2$, is intercepted by the conductor array of reflector 3. Component $E''_3$ parallel to wires 7 is reflected but the component $E'_3$ perpendicular to wires 7 passes through the network. An outgoing wave $W_1$ traversing reflector 3 is polarized linearly in a direction perpendicular to that of the wave emitted by source 1, whereas an outgoing wave $W_2$ bypassing the reflector 3 remains polarized elliptically. It can be shown that the power loss due to the foreshortening of vector $E'_2$ relative to vector $E_2$ is equal to:

$$1 - \frac{1}{1 + T^2}$$

where $T = \tan \phi/2$ is the ellipticity coefficient with $\phi$ representing the difference between the phase shift undergone by the reflected component $E_2$ in a conventional Cassegrain antenna with polarization rotation (i.e. 360°) and the corresponding phase shift undergone by the corresponding component $E''_2$ in the present instance.

The distance L and the ratio $r_1/r_2$ are so chosen that the energy of the wave radiated by the antenna with elliptical polarization is lower, by 15 to 20 db, than the energy of the wave radiated with linear polarization.

The elliptical-polarization pattern radiated by the annular bean portion bypassing the wires 7 of reflector 3 has then an aperture at half power which is less by about 20% than that of the principal pattern generated by the linearly polarized central beam portion.

In the case of a monopulse tracking radar, whatever the polarization of the signal received, the sum channel will always have a nonzero output to be used as a reference for demodulation.

We claim:

1. A Cassegrain-type radar antenna with rotating linear polarization, comprising:

a source of linearly polarized outgoing radiation centered on an axis;

a paraboloidal principal reflector centered on said axis, said principal reflector including a solid concave mirror and a first array of linear conductors disposed in parallel planes including an angle of 45° with the direction of polarization of said outgoing radiation, said first array being spaced from said mirror by a distance differing substantially from a quarter wavelength at the midfrequency of said outgoing radiation; and an auxiliary reflector centered on said axis opposite said source and said principal reflector, said auxiliary reflector being formed from a second array of linear conductors disposed in planes parallel to one another and to said direction of polarization for directing the outgoing radiation from said source toward said principal reflector from which said radiation is sent out with elliptical polarization in an axially extending beam, said auxiliary reflector having a radius less than that of said principal reflector for intercepting only a central part of said beam and passing only a component of the radiation thereof with linear polarization perpendicular to said direction, the radiation in an annular part of said beam not intercepted by said auxiliary reflector retaining said elliptical polarization.

2. A radar antenna as defined in claim 1 wherein said second array is hyperboloidally curved with one focal point at the phase center of said source and with another focal point coinciding with a common focal point of said mirror and of said first array.

3. A radar antenna as defined in claim 1 or 2 wherein said distance is substantially less than a quarter wavelength at said midfrequency.

4. A radar antenna as defined in claim 3 wherein said distance and the ratio of the radii of said principal and auxiliary reflectors are of such magnitudes that the energy of the elliptically polarized radiation of said annular part is lower by substantially 15 to 20 dB than the energy of the linearly polarized radiation of said central part.

5. A radar antenna as defined in claim 1 or 2 wherein the conductors of said first and second arrays are metal wires.

* * * * *